Sept. 14, 1954
R. T. HENDRICKSON
2,689,136
RESILIENT SUSPENSION
Filed Dec. 2, 1953
6 Sheets-Sheet 1
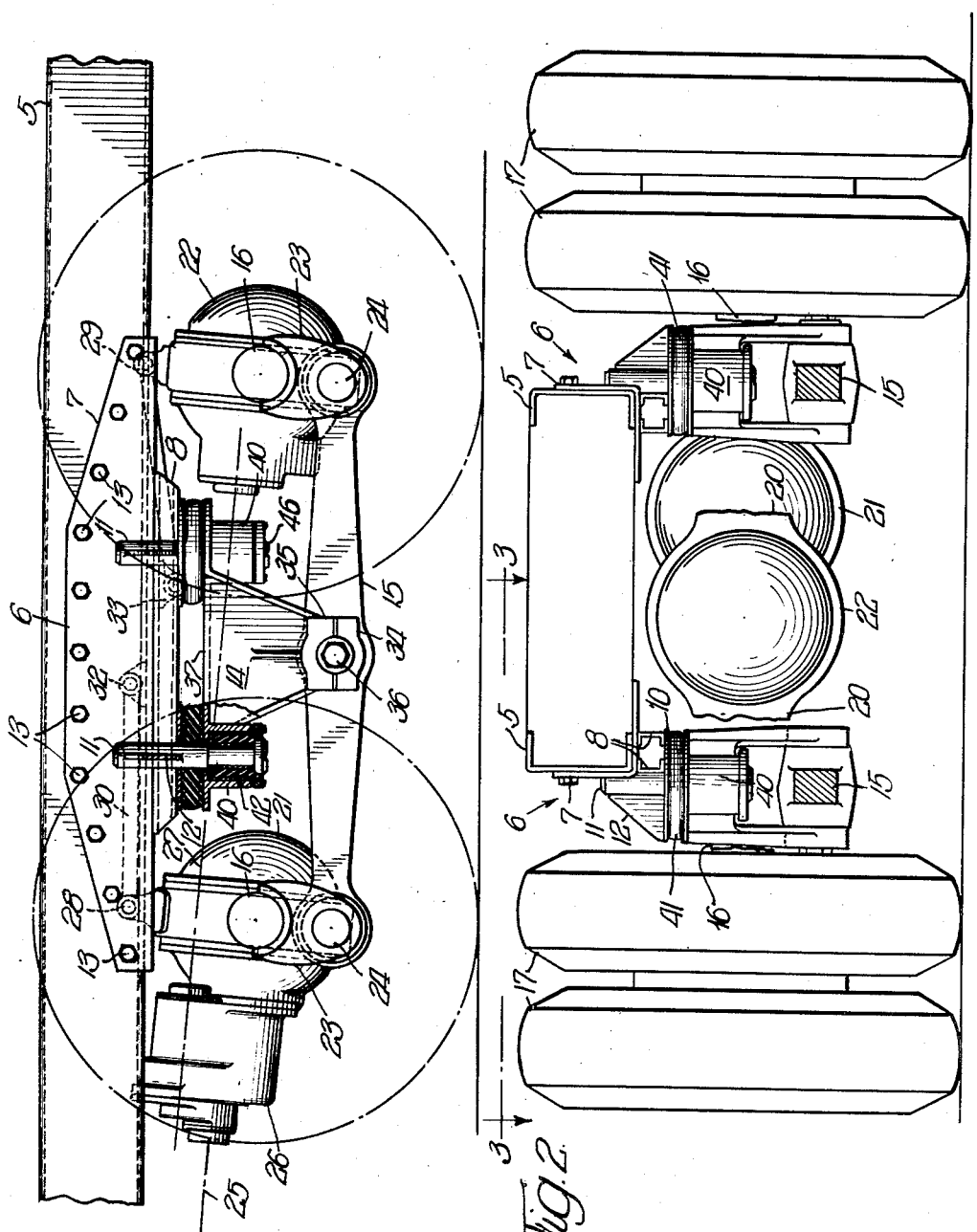
INVENTOR.
Robert T. Hendrickson,
BY
Cromwell, Greist & Warden
ATTYS.

Sept. 14, 1954  R. T. HENDRICKSON  2,689,136
RESILIENT SUSPENSION
Filed Dec. 2, 1953  6 Sheets-Sheet 2
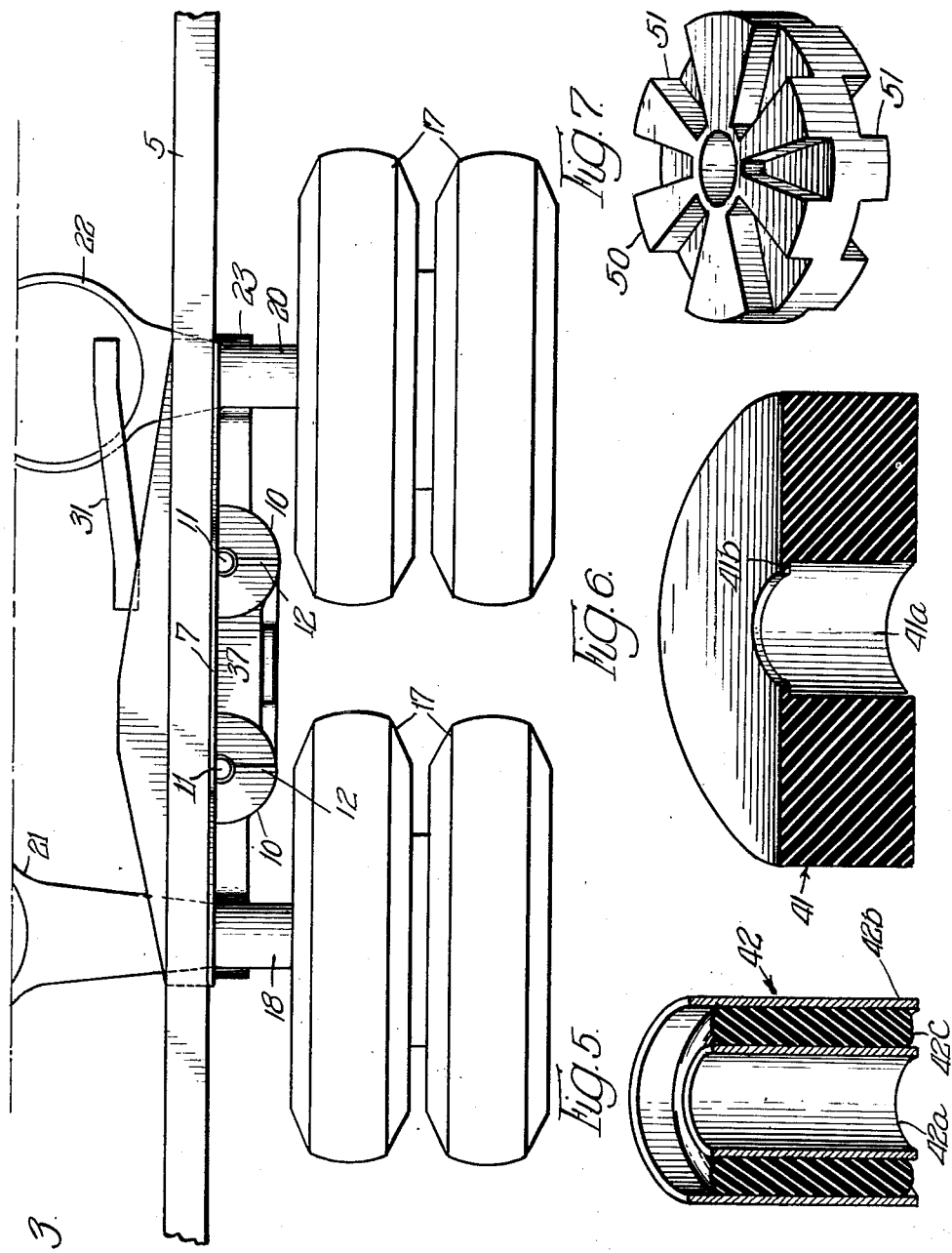
INVENTOR.
Robert T. Hendrickson,
BY
Cromwell, Greist & Warden
Attys.

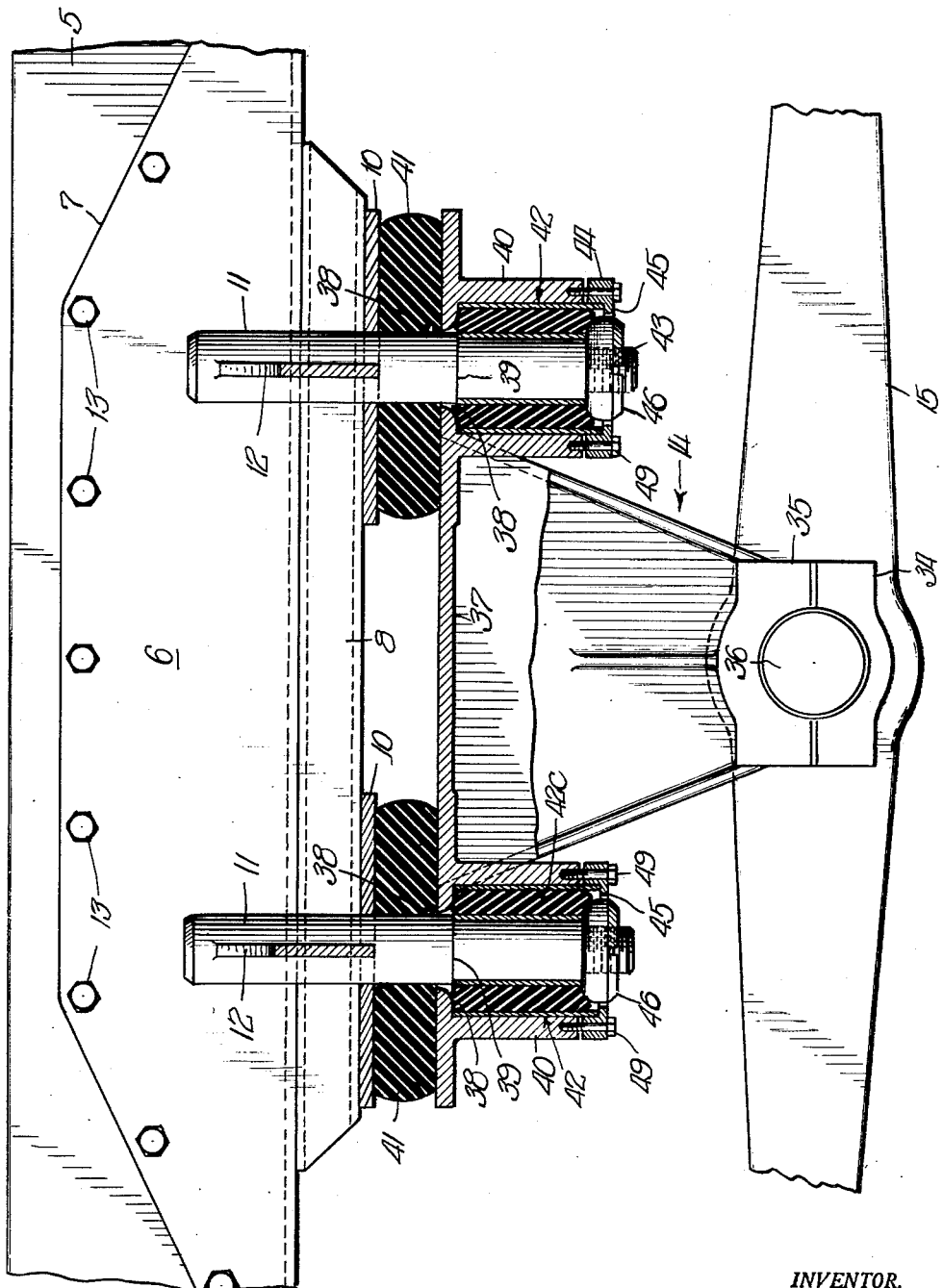

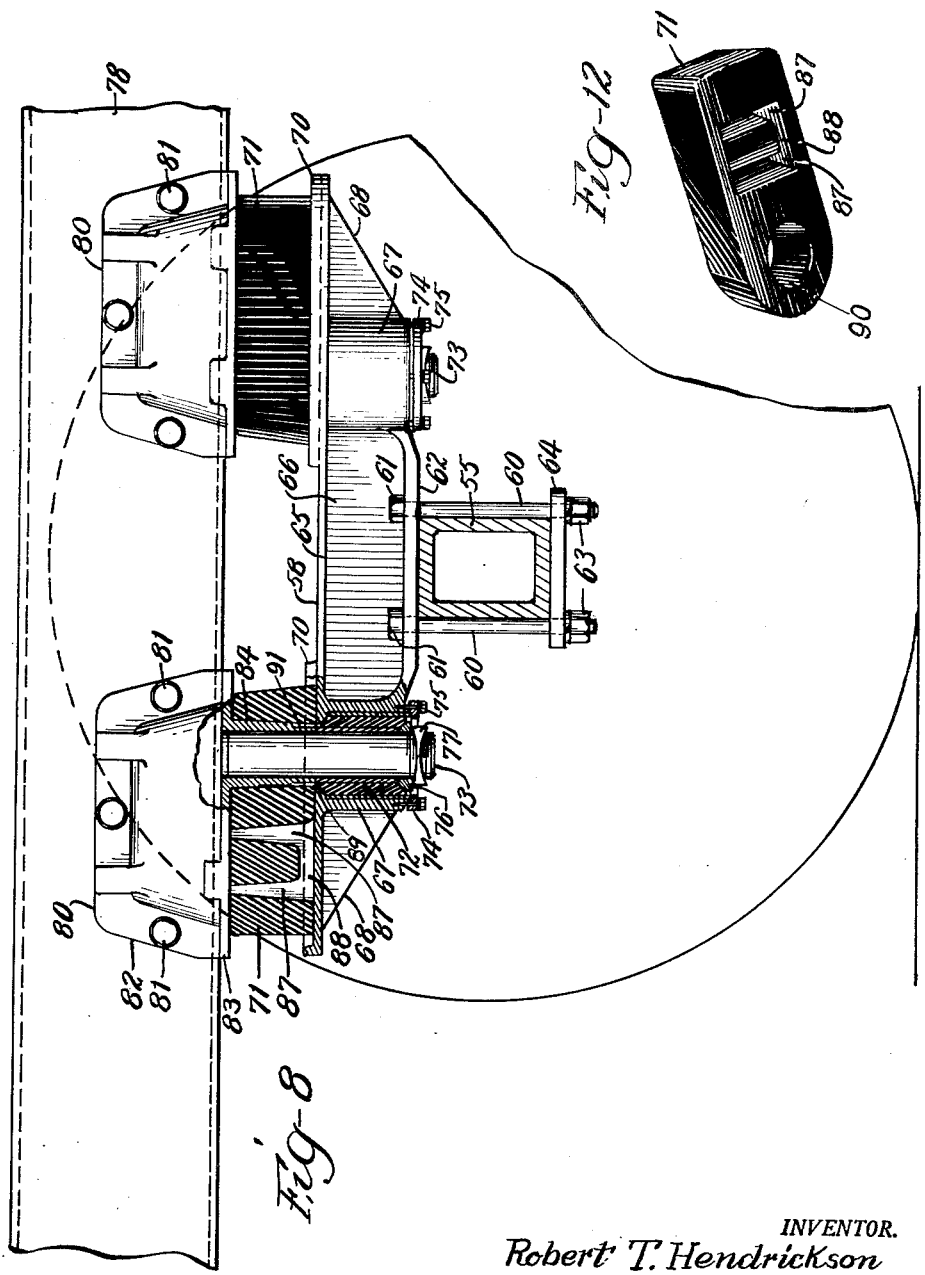

Sept. 14, 1954     R. T. HENDRICKSON     2,689,136
RESILIENT SUSPENSION
Filed Dec. 2, 1953     6 Sheets-Sheet 5
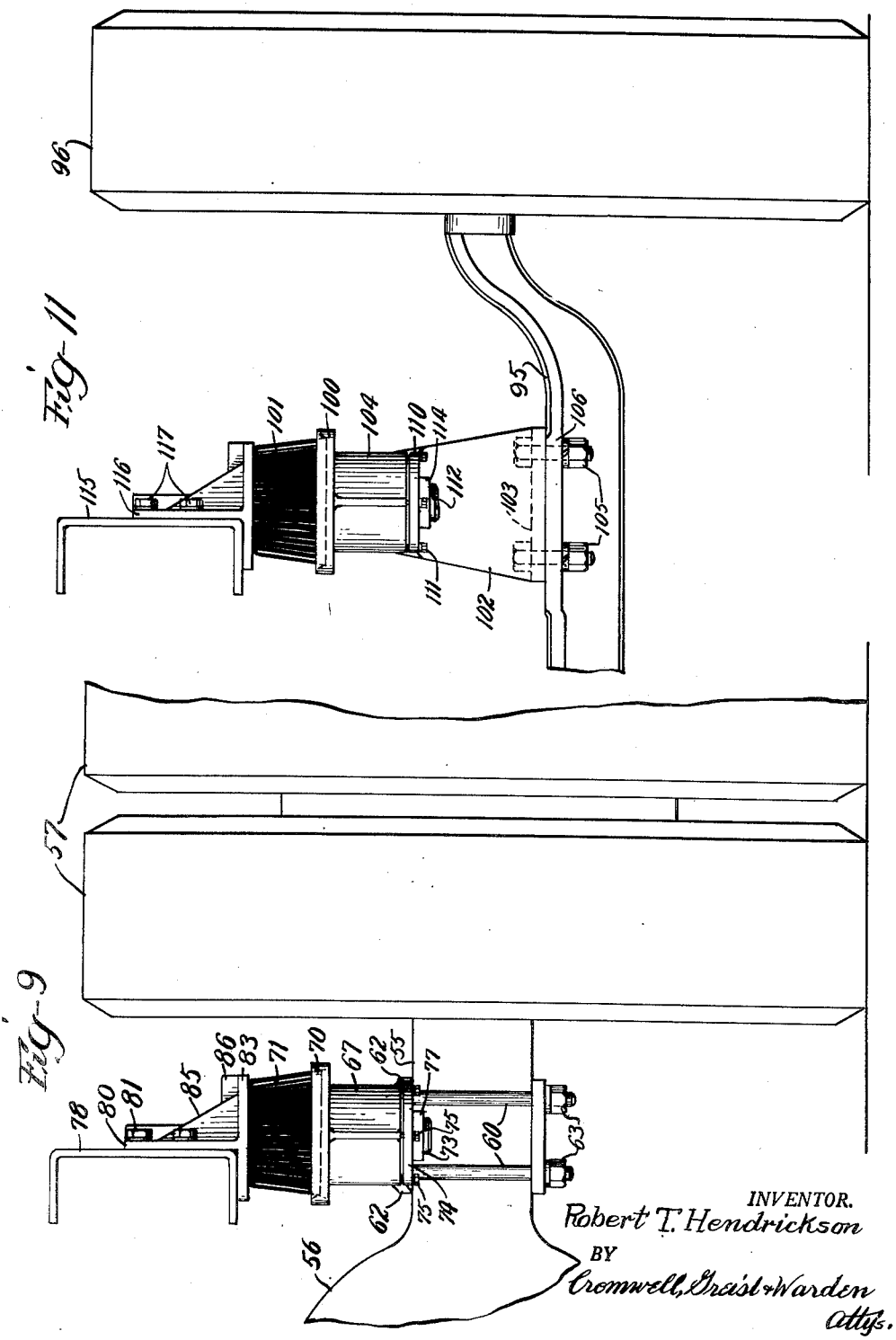
INVENTOR.
Robert T. Hendrickson
BY
Cromwell, Grist & Warden
Attys.

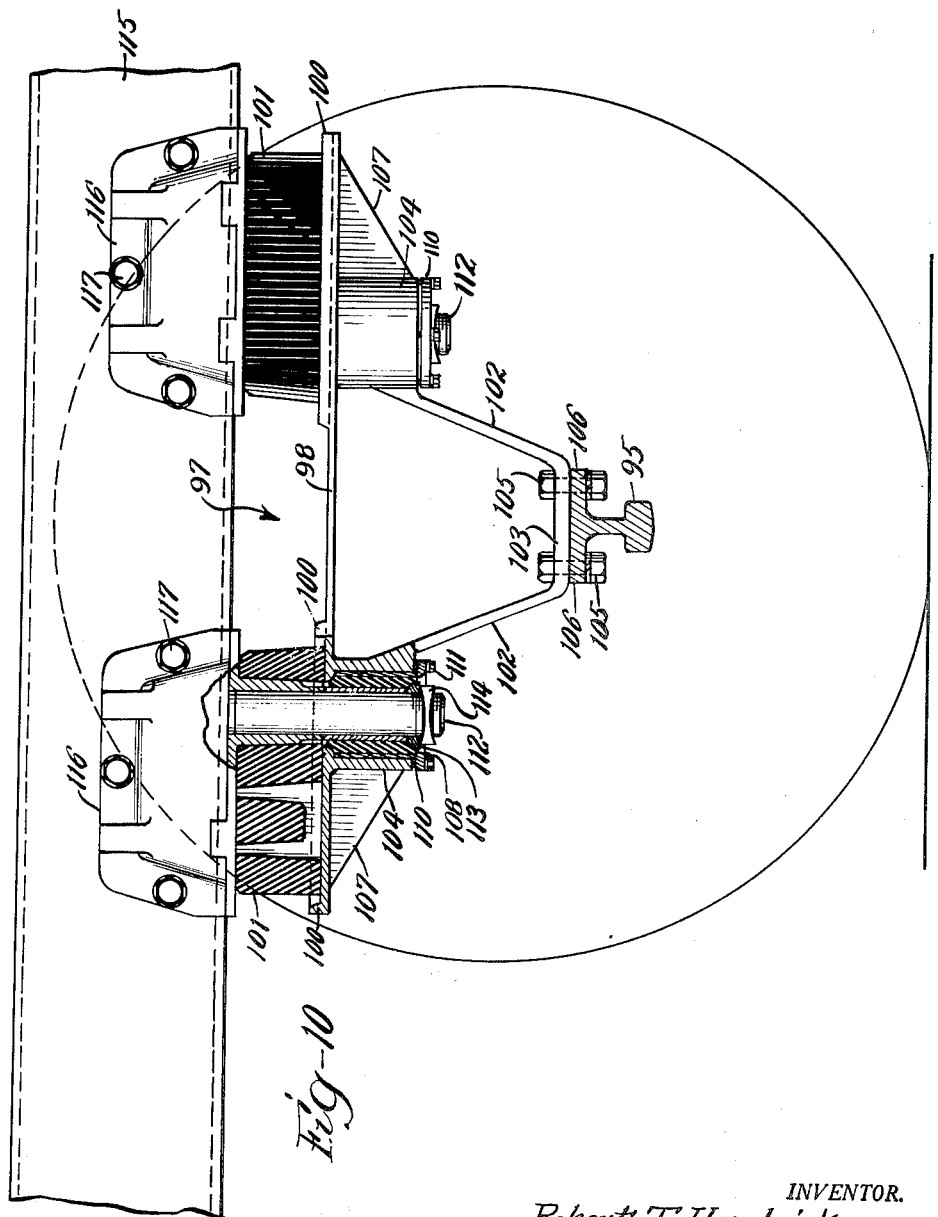

Patented Sept. 14, 1954

2,689,136

UNITED STATES PATENT OFFICE 2,689,136

RESILIENT SUSPENSION

Robert T. Hendrickson, Hinsdale, Ill., assignor to Hendrickson Motor Truck Co., Lyons, Ill., a corporation of Illinois Application December 2, 1953, Serial No. 395,655

15 Claims. (Cl. 280—104.5)

1

This invention relates, generally, to innovations and improvements in springless suspensions for vehicles wherein rubber or a rubber-like material is used to provide a resilient suspension of the frame from the axles. This application is a continuation-in-part of my copending application, Serial No. 250,833, filed October 11, 1951, now abandoned.

Springless axle suspensions for vehicles, using resilient mountings, have been previously proposed. Among the patents which have issued disclosing such springless resilient mountings are the Peterman Patents Nos. 2,318,257 and 2,360,619, for example.

An important object of the invention is an improved springless suspension for resiliently mounting or supporting a vehicle frame on either single or tandem axles, without the use of radius and/or torque rods, wherein resilient rubber-like cushions absorb primarily vertical load stresses, while horizontal stresses, such as driving and braking stresses, are primarily absorbed by longitudinally spaced vertical pins rigidly attached to the vehicle frame in a front-to-rear direction engaging within vertical sleeves formed of resilient rubber-like material which are mounted within housings supported from a single axle or tandem axles as the case may be.

A further object of the invention is to increase the stability of such a suspension by suitably increasing the spacing between the load or weight supporting cushions.

Another important object of the invention is a resilient axle suspension unit which is adapted to be interposed between a vehicle frame and either a single axle or the equalizing beam of a tandem axle assembly, which comprise a pair of vertical pins with suitable bracket means for attaching the pins to the vehicle frame so that the lower ends project downwardly therefrom on opposite sides of the single axle or on opposite sides of the middle of an equalizing beam extending between tandem axles, a fixture pivotally mounted on a single axle or on the middle of an equalizing beam which carries a pair of spaced vertical housings within which are located resilient sleeves surrounding the lower projecting ends of the pins, and a cushion or cushions interposed between the frame and the fixture for absorbing vertical load stresses while horizontal stresses including driving stresses and braking stresses are primarily absorbed by the pins engaging the resilient sleeves.

A further object of the invention is the use of such springless axle suspensions to support vehicle frames on front and rear axles without the use of radius and/or torque rods.

2

Another important object of the invention is an improved springless suspension for the axle units of trucks and trailers wherein components formed of rubber or rubber-like material are used and relied on resiliently to support and connect the vehicle frames and bodies on and to single axles or multiple axle units so as to support and absorb the vertical and horizontal stresses without frictional interengagement of hard surfaces between which wear can take place.

Certain other objects of the invention will, in part, be obvious and will, in part, appear hereinafter.

For a more complete understanding of the nature and scope of the invention, reference may now be had to the following detailed description thereof taken in connection with the accompanying drawings wherein:

Fig. 1 is a side elevational view partly broken away and in vertical section showing one side of a tandem rear axle suspension unit embodying the invention, for a truck or tractor unit;

Fig. 2 is a rear elevational view partly in section of the unit shown in Fig. 1, certain parts being omitted or broken away in order to show the construction of the resilient suspension;

Fig. 3 is a fragmentary top plan view showing one-half of the unit of Fig. 1 and taken on line 3—3 of Fig. 2;

Fig. 4 is a side elevational view on enlarged scale and partly in vertical section of the resilient suspension between the frame and the side beam saddle as shown in Fig. 1;

Fig. 5 is a sectional perspective view of one of the resilient sleeve elements which is used to absorb horizontal stresses in the resilient suspension shown in Fig. 4;

Fig. 6 is a sectional perspective view of one of the resilient cushions used to absorb vertical stresses in the suspension structure shown in Fig. 4;

Fig. 7 is a top perspective view of a modified form of resilient cushion that may be used in place of the one shown in Fig. 6;

Fig. 8 is a side elevational view, partly in vertical section, showing a second embodiment of the invention in the form of a resilient axle suspension interposed between the housing of a single rear axle and a vehicle frame;

Fig. 9 is an end elevational view of the single rear axle suspension shown in Fig. 8;

Fig. 10 is a side elevational view, partly in vertical section, showing a third embodiment of the invention in the form of a resilient axle suspension interposed between a front axle and a vehicle frame;

Fig. 11 is an end elevational view of the front axle suspension shown in Fig. 10; and Fig. 12 is a perspective view, looking from the bottom of one of the pair of resilient load cushions used in the axle suspensions shown in Figs. 8-11.

Referring to Figs. 1-4 of the drawings, the frame of the vehicle includes a pair of longitudinal channel beams 5—5 on the opposite sides of which bracket fixtures, indicated generally at 6—6, are attached. Each bracket 6 is fabricated from components comprising an angle member 7 which fits the adjacent channel 5 as shown, and to the underside of which is welded a pair of channel lengths 8—8 (Fig. 2). A pair of circular disks 10—10 is welded to the underside of each of the pairs of channels 8—8, each of the disks 10 being centrally apertured so as to receive a vertical pin 11. Each of the pins 11 is flattened or cut away adjacent the upper end thereof so as to fit flat against the vertical leg of the adjacent angle member 7 and against the outer side of the adjacent channel member 8, as shown in Figs. 2 and 3. In order to strengthen each of the bracket units 6, a triangular gusset 12 is provided for each of the pins 11 and is set against the upper end thereof on the top of the adjacent disk 10 in the manner shown in Figs. 2 and 3. Each of the brackets 6 as above described is preferably fabricated by welding the various parts together. Bolts 13—13 (Fig. 1) may be used to attach the brackets to the channel stringers 5—5.

Each of the brackets 6 is located over a saddle designated generally at 14 on which the bracket is resiliently mounted. Each of these saddles 14 is pivotally mounted and supported on the middle of a side or walking beam 15, extending between, and pivotally connected to, the ends of tandem axles 16—16.

A pair of dual wheels 17—17 is mounted on the opposite ends of each of the longitudinally spaced axles 16 as shown in Figs. 2 and 3. Each of the axles 16 passes through front and rear axle housings indicated at 18—18 and 20—20, respectively. Differential housings 21 and 22 are located between the axle housings 18—18 and 20—20, respectively, and may be integrally formed therewith. The opposite ends of each of the axle housings 18 and 20 are provided with hangers 23—23 (Fig. 1) which are welded thereon, the bottom ends of these hangers being bifurcated so as to straddle the eyes integrally formed on the opposite ends of each walking beam 15. The ends of the beams 15 are pivotally connected to the respective hangers 23 by the pins 24.

In the particular unit shown in the drawings, each pair of the axles 16 is driven. Power is delivered to the unit by means of a propeller shaft indicated by the line 25 to a gear box 26 attached to the front differential housing 21. The front pair of axles 16 is driven from the gear box 26 through a known differential gear unit and power is delivered from the gear box 26 to the rear axles 16 by means of a drive shaft indicated by the line 27 which leads into the rear differential housing 22. The housings 21 and 22 are held in the proper angular position by means of torque rods 30 and 31, respectively (Fig. 1). Each of these rods 30 and 31 is pivotally connected at one end to the top of the adjacent housing 21 or 22 as indicated at 28 and 29, respectively, and is pivotally connected at the opposite end to the frame as indicated at 32 and 33, respectively.

It will be understood that the present invention is particularly directed to the means for resiliently supporting the vehicle frame including the beams 5—5 on the saddles 14.

Each of the saddles 14 is provided with a set of removable bottom bearing halves 34—34, each of which mates with an upper bearing half 35 integrally formed as part of the saddle 14. The mating bearing halves 34 and 35 provide journal bearings on the opposite sides of each saddle 14 by which the saddle is pivotally mounted on the opposite ends of a shaft 36 passing through the middle of each of the beams 15 and extending across the unit so that the one shaft 36 serves both walking beams 15. The top of each of the saddles 14 is provided with an integrally formed horizontal flat plate 37 which is long enough so as to extend underneath each of the adjacent brackets 6 including each of the pairs of disks 10 forming portions thereof. Each of the horizontal plates 37 is provided with a pair of openings 38—38 therein (Fig. 4) down through which one of the two sets of pins 11 projects with a sloppy fit providing ample clearance, as shown. Each of the saddle plates 37 is provided with a pair of downwardly extending housing sleeves 40—40, each of which is concentrically aligned with one of the openings 38. The pins 11 are long enough so as to project through each of these housings 40 as shown.

As stated above, an important object of the invention is resiliently to mount the vehicle frame including the side beams 5—5 onto the saddles 14 and side beams 15—15 without using springs and in such a manner that there is no wear encountered by virtue of one part formed of metal or other material frictionally engaging and wearing against another part formed of hard material. In this connection there are two principal types of load or stress involved in such a resilient mounting which must be absorbed and provided for in order so to resiliently mount the vehicle frame on the tandem axles. One of these loads is primarily composed of vertical stresses (e. g., weight of frame and load) and the other is primarily composed of horizontal stresses (e. g., driving and braking stresses). In the embodiment of the invention which is shown, the vertical or compression stresses are absorbed in resilient cushion members or elements, which are indicated at 41 in the drawings. Referring to Fig. 6, it will be seen that each one of these cushion elements 41 is composed of a ring or tore of resilient rubber material having flat top and bottom surfaces. Preferably, the central hole 41a through a ring 41 is somewhat larger than the pins 11 so as to leave room for flow of the rubber when compressed as shown in Fig. 4. A centering flange 41b is integrally formed at the top of each opening 41a for convenience in assembling the cushions 41 on the pins 11.

It will be seen that one of the resilient cushion elements 41 is provided for each of the pins 11 and is interposed between the bottom of one of the disks 10 and the top of the adjacent end of one of the flat platforms 37. This arrangement is most clearly shown in Fig. 4. Thus, there will be four of the cushion elements 41 in the particular embodiment of the invention shown in the drawings and substantially all of the compression or vertical stresses involved in supporting the vehicle frame on the tandem axles will be absorbed by these four compression elements.

The resilient sleeve elements for absorbing the horizontal stresses are indicated generally at 42 in Fig. 5. These elements comprise inner and outer metal sleeve members 42a and 42b, respectively, between which is located a sleeve member 42c formed of a rubber-like material such as natural rubber, neoprene or butyl rubber. Preferably, the rubber sleeves 42c are under considerable internal compression so as to better absorb horizontal stresses exerted in any direction. Rings of rubber which are relatively squat and thick in cross section are stretched out and inserted into place between the metal sleeves 42a and 42b to provide the sleeves 42c. It will be observed in Fig. 5 that the inner sleeve or tube 42a is somewhat shorter than the outer sleeve member 42b. The element 42 is fabricated in such a way that when there is no stress placed on this element the parts will occupy the relationship shown in Fig. 5 with the bottom ends of the metal sleeves 42a and 42b being approximately even with each other and with the upper end of the sleeves 42a being inwardly located with respect to the upper end of the sleeve 42b.

The elements 42 are so dimensioned that they slide into the housings 40 and the inner sleeve members 42a fit closely over the lower ends of the housed pins 11 with the upper ends of the inner sleeves 42a engaging shoulders 39—39 on the pins 11. The bottom end of each of the pins 11 is turned down and externally threaded as indicated at 43. A bottom retaining ring member 44 is provided for each of the housings 40 to hold the respective resilient sleeve units 42 in place therein, the rings 44 having inwardly extending circumferential flanges 45 which engage the bottom ends of the outer sleeves 42b as shown. Each of the retainer rings 44 is secured to the respective housings 40 by a pair of bolts 49—49. A nut 46 is provided for the threaded end 43 of each of the pins 11. After one of the resilient sleeve elements 42 is put in place in a housing 40, one of the nuts 46 is applied to the threaded end 43 and the nut is tightened so as to raise the inner sleeve 42a against the adjacent shoulder 39 and place the resilient sleeve member 42c under initial upward tension. The upper side of each nut 46 engages the bottom end of the adjacent inner sleeve member 42a as shown. In this way each of the resilient sleeves 42 is placed under initial tension so that when the vehicle is loaded the initial tension will be relieved and for the most part the sleeves 42c will be under little, if any, vertical stress.

It will be noted from Fig. 4 that openings 38 and the nuts 46 have rounded contours for engaging the opposite ends of the rubber sleeves 42c. The rubber flows around these contoured or rounded surfaces, as shown. The nuts 46 also serve as snubbers to prevent the pins 11 from drawing out of the sleeves 42a when the wheels drop into holes in the road or the frame bounces when the vehicle is traveling over rough roads at high speeds.

The resilient sleeve elements 41 serve to carry or absorb the horizontal stresses involved in supporting the vehicle frame through beams 5 on the saddles 14. These horizontal stresses are encountered during travel of the vehicle such, for example, as when it accelerates, passes around curves, rides along at an angle on a crowned road, or the brakes are applied quickly.

The pairs of pins 11 and the resilient mountings associated therewith including the cushions 41 and the sleeves 42 are spaced apart sufficiently on opposite sides of the centers of the walking beams 15 so as to give the desired control and stability. A spacing of eighteen inches between centers of the pins is satisfactory.

It will be seen that the vertical and horizontal stresses are supported and absorbed by the resilient mounting arrangement shown and described without there being any interengagement or friction between hard surfaces. Thus, there is nothing to wear out in the resilient mounting structure and lubrication is not required.

Lubrication of the tandem axle suspension unit can be eliminated by employing rubber bushings of known type at the pivot points, namely: where the saddles 14 are pivoted on the walking beams 15; where the ends of the beams 15 are pivoted on the axles 24; and where the torque rods 30 and 31 are pivoted at their opposite ends. These rubber bushings may be of the type disclosed, for example, in the following patents: Quartullo 2,237,575; Branstrator 2,196,954; Peterman 2,318,257; and Mackie 2,493,004.

In Fig. 7 a rubber cushion 50 is shown which may be substituted for the cushions 41. The cushions 50 have cut-out sectors 51—51 in the top and bottom to facilitate flowing of the rubber under compression. This type of cushion is sometimes preferred over cushions 41 since it provides an easier ride when the vehicle is empty or loaded light.

Referring to Figs. 8 and 9 of the drawings an embodiment of the invention is shown which is used to support the rear of a vehicle frame or body on a single rear axle. In this embodiment the resilient axle suspension is interposed between an axle housing 55 and the vehicle frame. The axle housing 55 is integrally formed with a differential housing 56. A pair of dual wheels 57—57 are mounted on the outer end of the axle in accordance with the usual and known construction. A rigid fixture 58 is rigidly secured to the axle housing 55 by means of shackle bolts 60—60 with the heads of the bolts 61—61 resting on flanges 62—62 formed on opposite sides of the fixture 58, and with the bottom ends of the bolts carrying nuts 63—63 which are tightened up against the bottom of a plate 64 which extends across the bottom of the axle housing 5.

It will be noted that the fixture 58 is elongated and extends longitudinally of the body frame and crosswise to the axle housing 55. The fixture 58 has a flat integrally formed upper platform or plate 65 from which depends a central vertical web 66 and a pair of integrally formed cylindrical housings 67—67. Gussets 68—68 provided on the outer ends of the fixture 58 add strength and rigidity thereto. Integrally formed retaining flanges 70—70 stand up around the opposite ends of the platform 65 and serve to restrain and confine the bottoms of a pair of resilient cushions or blocks 71—71 when under full compression. The cushions 71 are formed of rubber or a rubber-like material and are described below in connection with Fig. 12.

The housings 67—67 correspond to the housings 40—40 of the embodiment of the invention described above in connection with Figs. 1-6 and serve as supports for resilient sleeve inserts 72—72 which may have the same or similar construction to the resilient sleeve inserts 42 described above in connection with Fig. 5 of the drawings. The interiors or cores of the resilient sleeve inserts 72 are engaged in thrust transmitting relationship by the lower ends of a pair of downwardly projecting pins 73—73. The resilient sleeve inserts 72 are inserted into the housings 67 from the bottom and are retained therein by means of rings 74—74 secured in place by means of the stud bolts 75—75. The pins 73 are prevented from lifting out of the resilient sleeve 72 by means of retaining rings or washers 76—76 which are slipped over the bottom ends of the pins 73 and which are held in place by means of the nuts 77—77. The retaining rings 76 are rounded on the upper side for engagement with the bottom edge of the rubber sleeve inserts 72 as shown.

The vertical pins 73 are supported from the vehicle frame, represented by the channel beam 78 by means of a pair of bracket fixtures 80—80. These brackets 80 are bolted (or welded) to the vertical side of the channel 78 by means of bolts 81—81. The brackets 80 have vertical plate portions 82 and horizontal bottom plate portions 83. The vertical plate portions 82 fit against the vertical side of the channel 78 as shown in Fig. 9, while the horizontal bottom plate portions 83 fit over the top of the load-supporting cushions 71. The upper ends of the pin 73 are rigidly secured within integrally formed sleeve portions 84—84 which depend from the bottom of each bracket 80 as shown in Fig. 8.

The brackets 80 are reinforced and braced by means of the integrally formed, slanted wall portions 85—85 and bosses 86—86.

The load-supporting cushions 71, which are shown in bottom perspective in Fig. 12, are formed of dense rubber which have upwardly tapered side walls as shown in Fig. 9. The resiliency or deformability of these cushions is improved by forming the interior thereof with one or more cavities 87—87. These cavities are upwardly tapered and extend crosswise of the cushions 71 with the material between the bottom ends of the cavities being omitted as indicated at 88. The presence of the cavities 87 improves the ride qualities of the vehicle when empty or lightly loaded by increasing the resiliency of the cushions 71. Under full load, the cushions will have increased resistance to deformation, thereby providing resilient support for the heavy loads.

It will be noted that portions of the cushions 71 which are provided with the cavities 87—87 extend or are turned outwardly from the pins 73—73. The upper ends of these pins in their sleeves or sockets 84 pass through vertical holes 90 in the cushions 71 and this arrangement serves to secure the cushions in place. In order to relieve the load cushions adjacent the bottom ends of the holes 90—90, and to provide clearance between the bottom ends of the sleeve sockets 84 and holes 89 in the tops of the housings 67 the bottom ends of the sockets or sleeves 84 are cut away as indicated at 91—91 in Fig. 8.

The resilient suspension shown in Figs. 8 and 9 is capable of absorbing all of the usual stresses and strain including vertical stresses due primarily to the weight of the frame and load, and also horizontal stresses due primarily to driving and braking stresses. The cushions 71—71 are compressible in between the bottom plates 83 at the top and the opposite ends of the platform 65 at the bottom. When fully compressed the bottom ends of these cushions will be bulged out against the retaining ribs or flanges 70—70 and the thicknesses of the cushions will be correspondingly decreased. The stability of the mounting is increased by having the cushions 71—71 project outwardly beyond the pins 73—73 since the greater spacing increases the leverage.

As described above in connection with the embodiment shown in Figs. 1—6, the horizontal driving and braking stresses will be primarily absorbed by the interengagement of the lower ends of the vertical pins 73 against the interiors of the resilient sleeve bushings or inserts 72—72 located within the housing 67. If desired, the nuts 77 may be tightened so as to place these inserts under an initial upward stress when the vehicle is empty, which stress will be relieved as the vehicle is loaded. The upward stressing of the interior of the sleeve inserts is limited by the engagement of the upper ends of the liners of these inserts against the bottom edges of the downwardly depending sockets 84.

The resilient suspension shown in Figs. 8 and 9 is capable of completely absorbing and supporting all of the stresses so that it is possible to eliminate the torque and/or radius rods normally used in connection with a single rear axle. It will be appreciated that the cushions 71 and the resilient sleeve bushings 72 coact to support the vehicle body and some stresses and loads are in part supported and absorbed by both types of resilient members.

In Figs. 10 and 11 of the drawings another embodiment of the invention is shown which is particularly adapted for use in supporting the front end of a vehicle frame on a front axle 95. A front wheel 96 is mounted on the outer end or spindle portion of the axle 95 in known manner. This third embodiment also includes a rigid fixture indicated, generally, at 97 having a flat top platform section 98 with upstanding ribs or flanges 100—100 formed on opposite ends thereof for restraining the bottom ends of load-supporting cushions or blocks 101—101. These cushions 101 may have the same construction as the cushions 71—71 described above in connection with Figs. 8, 9 and 12. The fixture 97 has an integral middle section having side portions 102—102 which taper outwardly from a bottom portion 103 up to integrally formed housings 104—104. The fixture 97 is secured onto the top of the axle 95 by means of bolts 105—105 which extend through the bottom portion 103 and the lateral flanges 106—106 on the axle 95. The outer ends of the fixture 97 are reinforced by means of the gussets 107—107.

Each of the housings 104—104 is provided with a resilient sleeve insert or bushing 108 which corresponds to the sleeve inserts 42—42 described above in connection with Fig. 5. These inserts are retained in place by means of rings 110 secured to the bottom edges of the bottom edges of the housings 104 by means of bolts 111—111.

A pair of vertical pins 112—112 extend down through the resilient sleeve inserts 108 and are retained in place by means of the retaining rings 113 supported by the nuts 114 screwed over the bottom ends of each of the pins 112.

The vertical pins 112 are longitudinally spaced in a front-to-rear direction, equal distances on opposite sides of the axle 95. These pins are supported from the vehicle frame, which is represented by the channel member 115, by means of bracket fixtures 116—116. These brackets correspond to the brackets 80—80 described in connection with Figs. 8 and 9 and are bolted to the channel member 115 by bolts 117—117.

The two cushions 101—101 and the resilient sleeve inserts 108—108 in cooperation with the vertical pins 112—112 serve to resiliently support the vehicle frame on the front axle 95. This suspension acts to absorb and resiliently support both vertical and horizontal stresses and eliminates the need for torque and/or radius rods.

Since certain changes and modifications in design may be made without departing from the spirit and scope of the invention, the embodiments of the invention shown in the accompanying drawings and described above are intended to be interpreted as illustrative and not in a limiting sense.

What is claimed as new is:

1. A resilient axle suspension adapted to be interposed between a vehicle frame and axle support means therefor, comprising, a pair of vertical pins, means for rigidly attaching the upper ends of said pins to the vehicle frame in longitudinally spaced relation in a front-to-rear direction over said axle means, a pair of housings each of which surrounds the lower end of one of said pins, rigid connecting means interconnecting said housings, supporting means for mounting said rigid housing connecting means on said axle means, cushion means interposed in load supporting relationship between said frame and said rigid housing connecting means, and a sleeve of resilient rubber-like material disposed in each of said housings with the lower end of each pin in thrust transmitting engagement with the interior of the adjacent sleeve.

2. A resilient axle suspension adapted to be interposed between a vehicle frame and axle support means therefor, comprising a pair of vertical pins, bracket means for rigidly attaching the upper ends of said pins to the vehicle frame in longitudinally spaced relation in a front-to-rear direction over said axle means, a rigid fixture adapted to be mounted on said axle means and having a pair of housings longitudinally spaced so that each housing surrounds the lower projecting end of one of said pins, cushion means formed of resilient rubber-like material interposed in load supporting relationship between said bracket means and said rigid fixture with said vertical pins passing through openings in the opposite ends of the cushion means, and a sleeve of resilient rubber-like material disposed in each of said housings with the lower end of each pin in thrust transmitting engagement with the interior of the adjacent sleeve.

3. A resilient axle suspension adapted to be interposed between a vehicle frame and supporting axle means therefor, comprising, a pair of vertical pins, a bracket for rigidly attaching the upper end of each pin to a side of the vehicle frame in equally spaced front-to-rear relationship over said supporting axle means, a rigid elongated fixture having housings on the opposite ends thereof which surround the bottom projecting ends of said pins, means for mounting said fixture on said supporting axle means, a block of resilient yieldable rubber-like material interposed between each of said brackets and the adjacent end of said elongated fixture and having a vertical opening therein through which the adjacent one of said vertical pins passes, a sleeve bushing formed of resilient rubber-like material disposed in each of said housings with the lower end of each pin in thrust transmitting engagement with the interior of the adjacent sleeve, and means on the bottom end of each vertical pin preventing it from pulling out through the top of the surrounding sleeve bushing.

4. A resilient axle suspension for supporting one portion of a vehicle frame on the end of the adjacent axle means, comprising, a rigid elongated fixture carrying vertical housings on the opposite ends thereof and having horizontal platform portions extending at least over the top of each housing, means for attaching said fixture to the axle means so that it extends in a front-to-rear direction with respect to the length of the vehicle, a resilient sleeve-shaped bushing formed of rubber-like material disposed within each of said housings, a pair of vertical pins the lower end of each of which projects down into one of said bushings in interengagement with the interior thereof, bracket means for rigidly securing the upper end of each pin to a rigid portion of the vehicle frame with the bottom of said bracket means having horizontal platform portions on the bottom thereof overlying and spaced above said platform portions on said housings, and a load-supporting elongated block of resilient rubber-like material disposed between the opposing platform portions between the housing and bracket at each end of the resilient axle suspension, each block having a hole therein through which the adjacent vertical pin projects.

5. The resilient axle suspension called for in claim 4 wherein said horizontal platform portions on said rigid elongated fixture and on said bracket means project outwardly beyond each of said vertical housing and wherein a major portion of each of said resilient load-supporting blocks lies outwardly of said vertical pins and in between an opposing set of said projecting platform portions.

6. The resilient axle suspension called for in claim 4 wherein each of said resilient load-supporting blocks has cavities formed therein to increase the deformability thereof in a vertical direction under compression load.

7. In a tandem axle suspension for a vehicle frame of the type in which are frame is supported on a pair of longitudinally spaced axles on which ground wheels are mounted, said axles being connected in spaced parallel relation by walking beams which are pivotally connected at their ends to the adjacent ends of the axles, and in which each of said beams at its middle supports a saddle pivotally mounted thereon: a bracket rigidly fastened to each side of said frame and located above the saddle adjacent thereto, a pair of longitudinally spaced pins rigidly mounted on each of said brackets and projecting downwardly through a pair of correspondingly spaced sloppy fitting holes provided therefor in the adjacent saddle, an annularly shaped frame supporting cushion of resilient rubber-like material fitting around each of said pins and compressed between said bracket and said saddle, a pair of downwardly projecting housings carried on each of said saddles so as to surround in spaced relationship the lower ends of each pair of said pins, a sleeve of resilient rubber-like material disposed in each housing and surrounding the pin the lower end of which is housed therein, and shoulder-providing means on the bottom end of each of said pins and in the top of each housing for holding each of said resilient sleeves under upwardly directed coaxial stress whereby vertical stresses are absorbed primarily by said annular resilient cushions and horizontal stresses are absorbed primarily by said resilient sleeve members.

8. A tandem axle suspension adapted to be interposed between a vehicle frame on one side thereof and a pair of tandem axles having ground wheels mounted thereon with a side beam for each set of trailing wheels having the opposite ends of the side beam pivotally connected to the adjacent axles and with a saddle pivotally attached to said side beam at the middle thereof, comprising, a pair of longitudinally spaced pins rigidly mounted on said vehicle frame and projecting downwardly on opposite sides of the middle of said side beam, a pair of housings mounted on each of said saiddles so as to surround the lower ends of said fixed pins in coaxial alignment therewith, at least one frame-supporting cushion interposed between said frame and said saddle, and a sleeve of resilient material disposed in each of said housings with the lower end of each pin engaging the interior of the adjacent sleeve, said cushions serving to carry and absorb primarily vertical stresses and said sleeves serving to absorb primarily horizontal stresses involved in supporting said vehicle frame.

9. A tandem axle suspension adapted to be interposed between a vehicle frame on one side thereof and a pair of tandem axles having ground wheels mounted thereon with a side beam for each set of trailing wheels having the opposite ends of the side beam pivotally connected to the adjacent axles and with a saddle pivotally attached to said side beam at the middle thereof, comprising, a pair of longitudinally spaced pins rigidly mounted on said vehicle frame and projecting downwardly on opposite sides of the middle of said side beam, a pair of housings mounted on each of said saddles so as to surround the lower ends of said fixed pins in coaxial alignment therewith, at least one frame-supporting cushion interposed between said frame and said saddle, a sleeve of resilient material disposed in each of said housings, and means for connecting the interior of each of said sleeves to the lower end of the pin extending therein so that said resilient sleeve is stressed upwardly to such an extent that vertical stresses are absorbed primarily by said cushions while horizontal stresses are primarily absorbed by said sleeves.

10. In a tandem axle suspension for a vehicle frame of the type in which a frame is supported on a pair of longitudinally spaced axles on which ground wheels are mounted, said axles being connected in spaced parallel relation by walking beams which are pivotally connected at their ends to the adjacent ends of the axles, and in which each of said beams at its middle supports a saddle pivotally mounted thereon: a pair of longitudinally spaced pins rigidly mounted on each side of said frame with their lower ends projecting downwardly on opposite sides of the middle of the adjacent walking beam, a pair of housings mounted on each of said saddles so as to surround the lower ends of the adjacent pair of pins in coaxial alignment therewith, an annular cushion fitting around each of said pins intermediate a portion of said frame and the adjacent saddle, and a sleeve of resilient material disposed in each of said housings with the lower ends of said pins engaging the interior of the respective sleeves so as to absorb the horizontal stresses while said cushions absorb the vertical stresses involved in supporting said vehicle frame.

11. In a tandem axle suspension for a vehicle frame of the type in which a frame is supported on a pair of longitudinally spaced axles on which ground wheels are mounted, said axles being connected in spaced parallel relation by walking beams which are pivotally connected at their ends to the adjacent ends of the axles, and in which each of said beams at its middle supports a saddle pivotally mounted thereon: a bracket rigidly fastened to each side of said frame and located above the adjacent saddle, each of said brackets including horizontal plate portions overlying horizontal plate portions on said saddles, a pair of pins longitudinally spaced on opposite sides of the middle of the adjacent beam rigidly mounted on each of said brackets with the lower ends of said pins projecting downwardly through a pair of correspondingly spaced sloppy fitting holes provided in the adjacent saddle plate portions, an annular frame supporting cushion fitting around each of said pins and compressed between said bracket plate portions and said saddle plate portions, a pair of downwardly projecting housings carried underneath each of said saddle plate portions so as to surround the lower ends of each pair of pins, a sleeve of resilient rubber-like material disposed in each housing with the interiors of said sleeves fitting each of said pins for close engagement therewith, shoulder providing means in the top of each housing for engaging the top end of each resilient sleeve adjacent the outer periphery thereof, and shoulder providing means on the bottom end of each pin for engaging the bottom end of each resilient sleeve adjacent the interior thereof whereby each of said sleeves is retained between said cooperating shoulders.

12. The construction called for in claim 11 wherein each of said sleeves comprises an outer metal sleeve member, an inner metal sleeve member and an intermediate sleeve of rubber-like material which is compressed between said inner and outer sleeves, and wherein said shoulder in the top of each housing engages the upper end of the outer sleeve member and said shoulder on the bottom end of each pin engages the bottom end of the inner sleeve member so as to place each of said rubber sleeves under an initial upward tension which is approximately neutralized under normal load conditions.

13. The construction called for in claim 11 wherein said shoulders are contoured so as to serve as snubbers for said sleeve members.

14. A resilient axle suspension adapted to be interposed between a vehicle frame and an axle, comprising, a pair of vertical pins, means for rigidly attaching the upper ends of said pins to the vehicle frame in longitudinally spaced relation on opposite sides of said axle, an elongated rigid fixture carrying vertical housing on the opposite ends thereof each of which surrounds the lower end of one of said pins, means for rigidly securing said fixture to said axle, a sleeve of resilient rubber-like material within each of said housings and surrounding the lower end of the pin therein in thrust transmitting engagement in all directions, and cushion means formed of resilient rubber-like material interposed in load-supporting relationship between said frame and said rigid fixture.

15. The resilient axle suspension called for in claim 4 wherein said bracket means have integral sleeve-shaped sockets depending from the bottom thereof in which the upper ends of said vertical pins are secured.

References Cited in the file of this patent

UNITED STATES PATENTS

| Number | Name | Date |
| --- | --- | --- |
| 1,731,387 | Masury | Oct. 15, 1921 |
| 1,912,498 | Rayburn | June 6, 1933 |
| 1,937,581 | Lord | Dec. 5, 1933 |
| 1,977,896 | Saurer | Oct. 23, 1934 |
| 2,162,714 | Hamblin | June 20, 1939 |
| 2,237,575 | Quartullo | Apr. 8, 1941 |
| 2,493,004 | Mackie | Jan. 3, 1950 |